(No Model.) 2 Sheets—Sheet 1.

C. S. FOWLER.
VALVE MECHANISM FOR CRACKER MACHINES.

No. 485,863. Patented Nov. 8, 1892.

Attest,
C. H. Benjamin
J. Kennedy

Inventor,
Charles S. Fowler
by H. P. Preble Jr.
his Atty.

(No Model.) 2 Sheets—Sheet 2.

C. S. FOWLER.
VALVE MECHANISM FOR CRACKER MACHINES.

No. 485,863. Patented Nov. 8, 1892.

Attest:
C. H. Benjamin
J. Kennedy

Inventor:
Charles S. Fowler
by W. P. Preble Jr.
his atty.

UNITED STATES PATENT OFFICE.

CHARLES S. FOWLER, OF BROOKLYN, NEW YORK.

VALVE MECHANISM FOR CRACKER-MACHINES.

SPECIFICATION forming part of Letters Patent No. 485,863, dated November 8, 1892.

Application filed June 16, 1892. Serial No. 436,900. (No model.)

*To all whom it may concern:*

Be it known that I, CHARLES S. FOWLER, a citizen of the United States, and a resident of the city of Brooklyn, State of New York, have made certain new and useful Improvements in Valve Mechanism for Cracker-Machines, of which the following is a specification.

The object of my invention is to provide an improved valve mechanism for supplying compressed air or other gas to the air-box of a cracker-cutting machine, such as is shown in my patent, No. 474,168, dated May 3, 1892, and relieving the pressure thereon and permitting the escape of said compressed air at the proper time.

Figure 1:
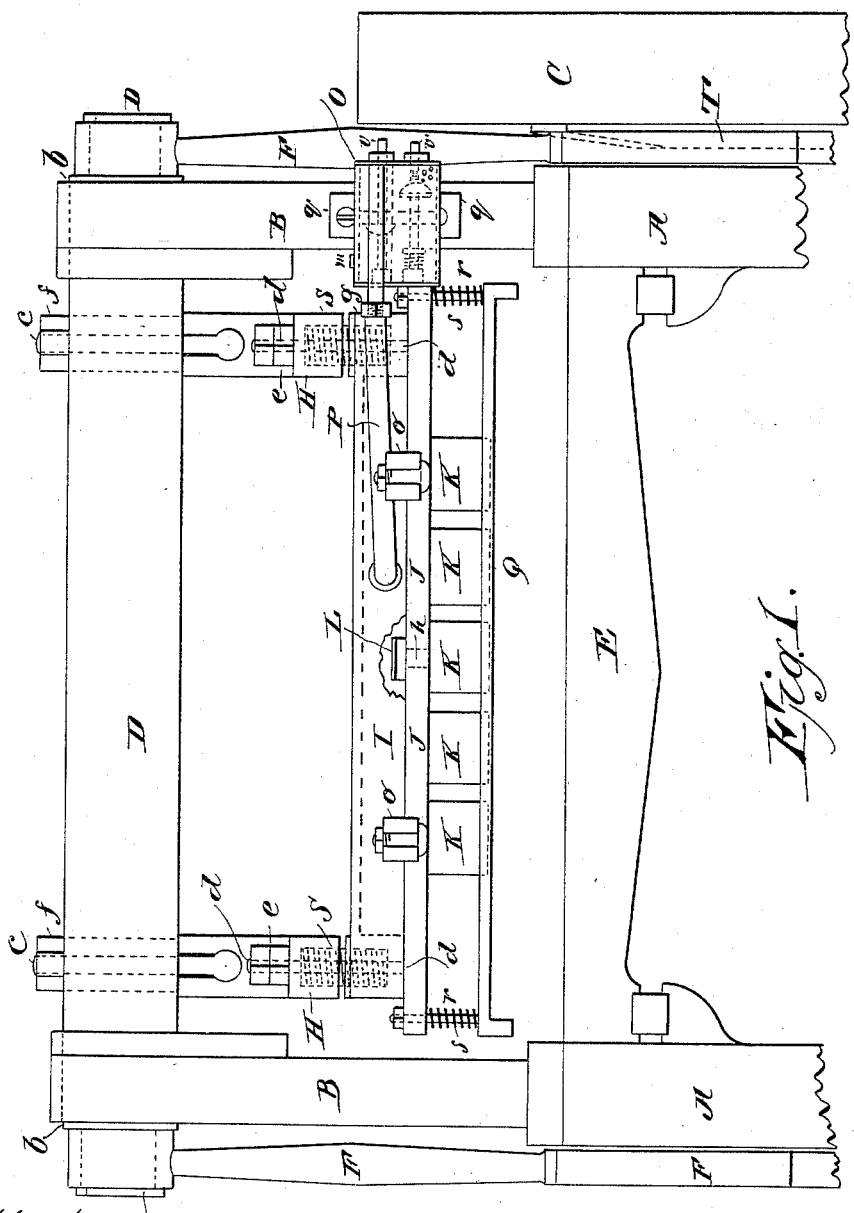
Figure 2:
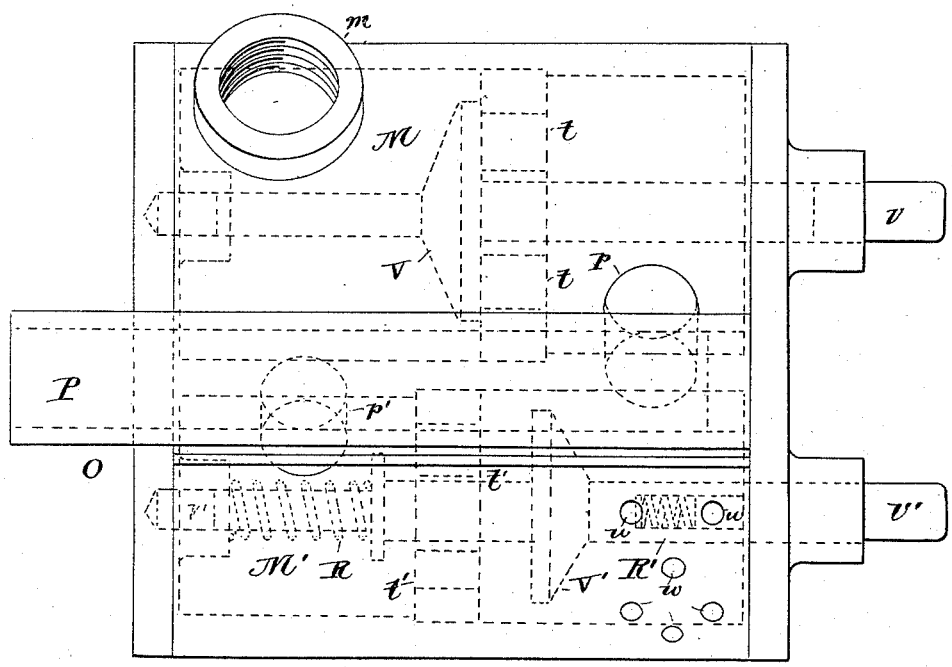
Figure 3:
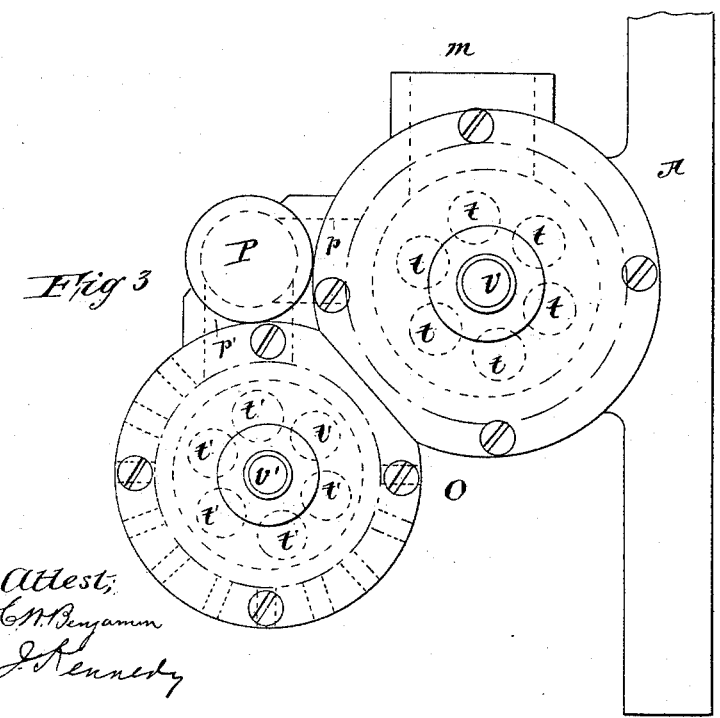

In the accompanying drawings, Figure 1 is a side elevation of that portion of a cracker-machine which contains the cracker-cutting mechanism provided with my improved valve mechanism. I have not thought it necessary to show those portions of the machine which convey the dough to the cutting mechanism and remove the cut crackers and scrap away from the cutting mechanism. Fig. 2 is an enlarged detail of my improved valve mechanism, seen from the side. Fig. 3 is an enlarged detail of the end of the valve mechanism.

Same letters indicate similar parts in the different drawings.

A is the framework of the machine, supporting the uprights or standards B.

C is the fly-wheel, which operates the entire machine and is mounted upon a suitable shaft (not shown) journaled in the framework A and driven by belting. (Not shown.) The dough-feeding mechanism (not shown) is situated behind the apparatus, (shown in Fig. 1,) and the removing mechanism (not shown) is situated in front of the apparatus, (shown in Fig. 1,) the framework A being extended sufficiently to support said dough-feeding and removing mechanism.

D is a vertically-reciprocating bar or cross-head fitted in the slots $b$ of the standards B.

E is the cutting-plate. The up-and-down movement of the cross-head D is produced by the eccentric-rods F, the upper ends of which are secured to the bar D and the lower ends of which are operated by eccentrics on the shaft of the fly-wheel in the usual manner, each revolution of the wheel C and shaft causing the eccentric-rods to make one up and one down stroke under the operation of the eccentrics.

The reciprocating bar D carries what may be called, as a whole, the "cutter-head," which moves up and down therewith into and away from contact with the dough-carrying apron. This cutter-head is rigidly connected to the bar D by the two yokes H, the center of which is bolted to the bar by the bolts $c$ and the nuts $f$, and the branches of which are bolted by means of the bolts $d$ and nuts $e$ to the corners of the air-box I.

The air-box I is of sufficient extent to cover the tops of all the cutters. The cutter-plate J is armed on its under surface with a number of hollow cutters K, each one of which has an opening $h$ at the top, which extends through the cutter-plate J, and over which is secured the spring cutter-valve L. The cutter-plate J is detachably connected with the base of the air-box I by screw-bolts $o$, joining the lugs projecting from the air-box with the lugs projecting from the cutter-plates. The air-box is supplied at the proper time with air through the pipe P, one end of which enters the hole in the side of the box and the other end of which connects with the valve O, attached to one of the standards B by the bracket $q$ and connected with a suitable reservoir of compressed air. (Not shown in the drawings.) Communication between the reservoir and the pipe P is normally closed, but is automatically opened by a cam T, (shown by dotted lines, Fig. 2,) fastened on the rim of the fly-wheel C and striking against the projecting valve at every revolution of said wheel C.

The machine is protected from the jar caused by the striking of the cutter-plate J in its descent by hollowing out the branches of the yokes on the under sides and also the upper part of the corners $g$ of the air-box frame and placing strong spiral springs in the openings thus made around the bolts $d$, which connect the yokes and the air-box together, leaving sufficient space between the surfaces of the yokes and the air-box to permit of a limited action of the springs.

Suspended below the cutter-plate J is the perforated clearing-plate or stripper Q, attached at the four corners by the bolts $r$, surrounded by the spiral springs $s$, and serving to prevent the scrap from being lifted through adhesion to the outside of the hollow cutters.

The valves L, which close the top of the individual cutters, are preferably of flat spring-brass and are normally open. When a charge of compressed air is admitted to the air-box through the pipe P to blow out the crackers, the pressure of said compressed air as soon as it has blown the crackers from the cutters closes said valves, the pressure upon them being strong enough to keep them closed long enough for the cutter to make another stroke. As a blast of compressed air is admitted to the air-box at every revolution of the fly-wheel, it is manifest that the valves would remain constantly closed in spite of the resilient force of the spring unless the pressure of the air in the box is diminished nearly or quite to that of the normal atmosphere. This is brought about by providing a suitable relief-valve communicating with the outside atmosphere and automatically opened at some time during the ascent or descent of the air-box to allow the compressed air to escape and for said relief-valve to be closed again before it is time for the next blast of air to be let into the air-box. The valves L being open at the instant when the cutter-plate and air-box begin their upward motion and the relief-valve being closed, the charge of compressed air which is admitted through the pipe P by the action of the cam T opening the valve-box O rushes into the hollow cutters and blows out the crackers therein, at once closing the valve L of each cutter from which the cracker is blown. Should the cracker in any cutter for any reason exert unusual resistance to being blown out, its corresponding valve L will not close immediately, and therefore the whole force of the charge of compressed air becomes directed against the cracker in that special resisting-cutter. This cracker then being blown out its corresponding valve L closes, and by the time the air-box and cutter-plate have reached the top of their upward stroke the relief-valve is automatically opened and the compressed air in the box is allowed to escape thereby. Thus when the air-box and cutters descend the air in the box I is only under the normal atmospheric pressure and the valves L opening automatically by their resilient force. Without this relief-valve or some equivalent means of restoring the air in the box I to its normal atmospheric pressure the residue of the charge of compressed air after blowing out the crackers would resist the opening of the valves L, and hence the cutters would fill up with dough on account of there being no force to expel the dough when cut.

The apparatus and construction thus far described are now well known, and my improvement consists in a valve mechanism by which this supplying the air-box with air and relieving the pressure thereon at the proper time is more easily, conveniently, and with greater certainty effected than has heretofore been the case. Instead of a separate valve for admitting air to the box and a relief-valve at some other part of the box for restoring the equilibrium, I provide the duplex valve or valve mechanism O, which, by reason of its peculiar construction, serves both to admit air into the box from the reservoir and to allow the air to escape from the box into the surrounding atmosphere. This duplex valve O consists of two independent compartments, each of which communicates with the pipe P through the openings $p\,p'$, respectively. Each of these compartments is provided with a valve and a valve-stem, which projects into the path of revolution of the cam T, before spoken of. One of these compartments M constitutes the inlet portion of the valve mechanism and communicates by the pipe $m$ with a reservoir of compressed air (not shown) and is separated into two compartments connected by the ports $t\,t$, which are normally closed by the valve V, held over said ports against the partition or valve-seat by the pressure of the compressed air entering through the pipe $m$. This valve V is opened for a very brief interval when the projecting stem $v$ is struck by the cam T, and thus admits air to the pipe P through the opening $p$, and hence into the air-box. The valve V is immediately closed as soon as the retreating of the cam T permits.

The relief-valve V' in the compartment M', which constitutes the relief portion of the valve mechanism, is normally open, being held open by the spring R, surrounding the valve-stem $v'$, and is only closed for a short interval by the cam T striking against the projecting valve-stem $v'$ immediately before the valve V is opened by the cam T striking against the valve-stem $v$. When the valve V' is closed, it rests against the valve-seat and closes the ports $t\,t'$. The spring-buffer R' is provided to diminish the force of the blow of the cam T through the valve-stem $v'$. The air received in the compartment M' through the opening $p'$ in the pipe P escapes through the ports $w$ into the surrounding atmosphere.

Although the drawings show a duplex valve mechanism consisting of two parallel cylinders set one on each side of a pipe P, it is obvious that other forms of duplex valves may be substituted, provided they are so arranged that the relief-valve is closed while the admission-valve is open, and vice versa.

The operation of this improved valve mechanism is as follows: The fly-wheel C revolving at the desired rate of speed and the rest of the cracker-machine operating in unison, the cam T is brought against the projecting valve-stem $v'$ and closes the valve V' at the instant that the crackers are cut from the sheet of dough under the cutter-plate. Immediately thereafter and before releasing the valve-stem $v'$ the cam T strikes the valve-stem $v$ and opens the valve V. A charge of compressed air rushes into the air-box through the pipe P and blows out the crackers, and the pressure on the air in the air-box is at once released by the almost simultaneous closing of the valve V and opening of the valve V', the air rushing back through the pipe P, through the opening $p'$ and compartment M' to the outer air through the ports $w$. This process is repeated for each revolution of the fly-wheel C, and the rest of the mechanism has to be so timed as to feed the dough and remove the crackers cut each time this operation of filling and emptying the air-box takes place.

I claim—

1. A cracker-machine provided with an air-box armed with suitable cutters and cutter-valves, a duplex valve connecting said air-box with a reservoir of compressed air and with the surrounding atmosphere, and mechanism for operating in succession the relief portion and the inlet portion of said duplex valve, substantially as shown and described.

2. A cracker-machine provided with an air-box armed with suitable cutters and cutter-valves, a duplex valve connecting said air-box with a reservoir of compressed air and with the surrounding atmosphere, and a cam brought into contact with the relief and inlet portions of said valve successively, whereby the relief portion is closed and kept closed, while the inlet portion is opened by said cam, and thereupon both portions are released by said cam and allowed to return to their normal positions, substantially as shown and described.

3. In a cracker-machine, a valve mechanism which consists of a normally-closed inlet portion and a normally-open relief portion, and devices which successively close the relief portion, open the inlet portion, close the inlet portion, and open the relief portion, substantially as shown and described.

CHARLES S. FOWLER.

Witnesses:
  W. P. PREBLE, Jr.,
  J. KENNEDY.